(12) United States Patent  (10) Patent No.: US 7,696,903 B2
Stam et al.  (45) Date of Patent: Apr. 13, 2010

(54) IMAGING SYSTEM FOR DETECTING VEHICLE AND HUMAN MOVEMENT

(75) Inventors: Joseph S. Stam, Holland, MI (US); Frederick T. Bauer, Holland, MI (US); Robert Steel, Coventry (GB)

(73) Assignee: Gentex Corporation, Zeeland, MI (US)

( * ) Notice: Subject to any disclaimer, the term of this patent is extended or adjusted under 35 U.S.C. 154(b) by 336 days.

(21) Appl. No.: 11/609,669

(22) Filed: Dec. 12, 2006

(65) Prior Publication Data

US 2007/0290886 A1 Dec. 20, 2007

Related U.S. Application Data

(63) Continuation-in-part of application No. 10/393,000, filed on Mar. 20, 2003, now Pat. No. 7,148,813.

(60) Provisional application No. 60/815,433, filed on Jun. 21, 2006.

(51) Int. Cl.
*G08G 1/095* (2006.01)
(52) U.S. Cl. .................. 340/907; 340/905; 340/933; 340/936
(58) Field of Classification Search ................ 340/907, 340/905, 933, 936, 910, 917, 908.1
See application file for complete search history.

(56) References Cited

U.S. PATENT DOCUMENTS

| 4,104,562 | A | 8/1978 | DiCola |
| 5,457,449 | A | 10/1995 | Kuning et al. |
| 5,635,902 | A | 6/1997 | Hochstein |
| 5,935,190 | A | 8/1999 | Davis et al. |
| 6,046,686 | A | 4/2000 | Mitchell et al. |
| 6,222,462 | B1 | 4/2001 | Hahn |
| 6,243,644 | B1 | 6/2001 | Dengler |
| 6,559,774 | B2 | 5/2003 | Bergan et al. |
| 6,570,998 | B1 * | 5/2003 | Ohtsuka et al. ............. 382/104 |
| 6,625,300 | B1 * | 9/2003 | Kyo ........................... 382/104 |
| 2003/0095043 | A1 * | 5/2003 | Butzer et al. ........... 340/539.13 |

\* cited by examiner

*Primary Examiner*—Anh V La
(74) *Attorney, Agent, or Firm*—Price, Heneveld, Cooper, DeWitt & Litton, LLP

(57) ABSTRACT

A traffic system for alerting a driver of a vehicle to a traffic sign includes a sensor and a control unit. The sensor may be an image sensor and the control unit may comprise a graphic processing unit (GPU) to detect the optical flow of objects in the captured images so as to distinguish moving vehicles from non-moving objects. The speed of vehicles may be detected such that the system may (1) activate lights to warn a driver if he is traveling too fast or (2) display the speed to either the driver or a police officer. The system may also be implemented and used as a geographic border monitoring system.

25 Claims, 6 Drawing Sheets

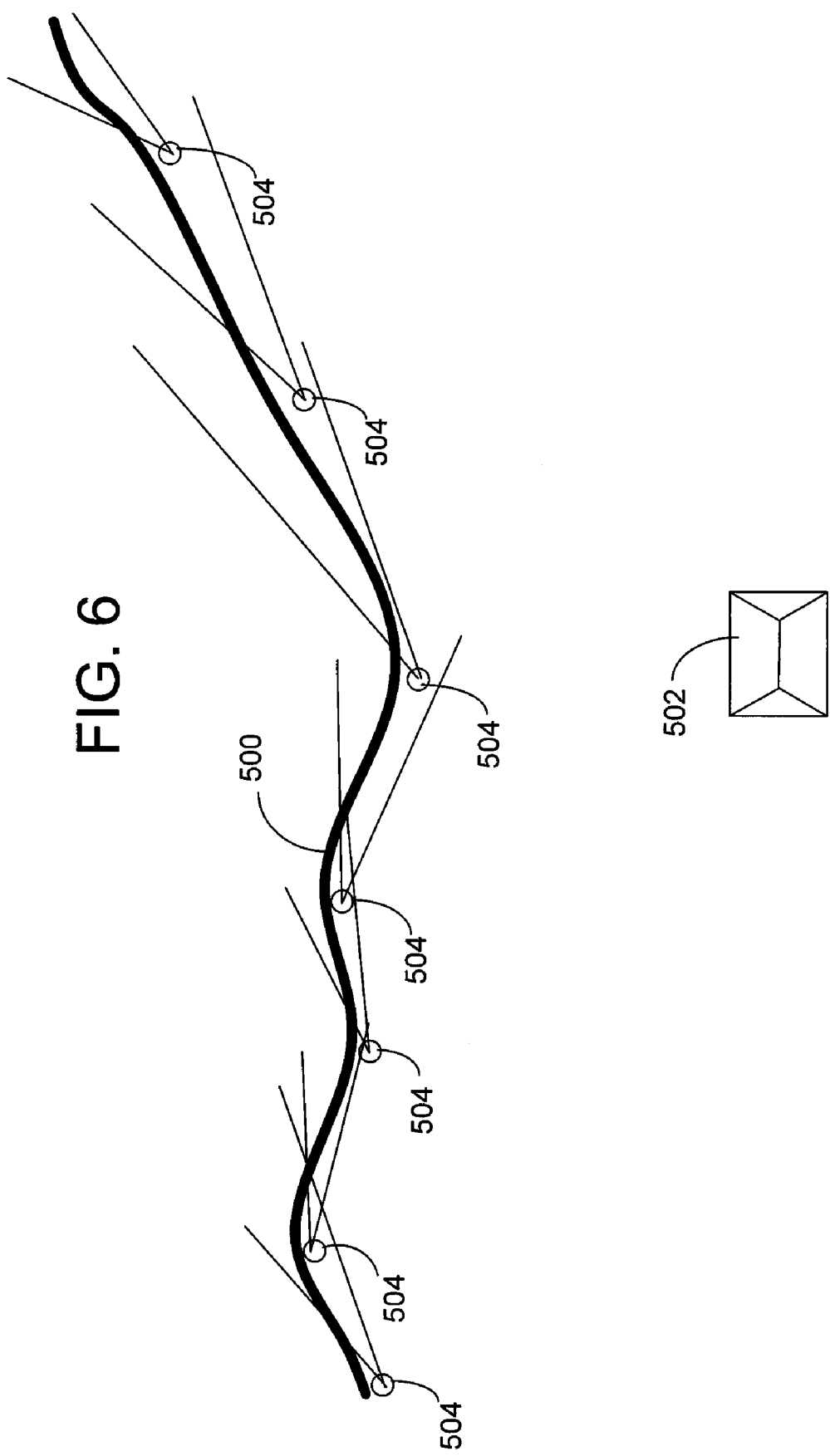

IMAGING SYSTEM FOR DETECTING VEHICLE AND HUMAN MOVEMENT

CROSS-REFERENCE TO RELATED APPLICATIONS

This application is a continuation-in-part of U.S. patent application Ser. No. 10/393,000 filed on Mar. 20, 2003 by Frederick Bauer et al., now U.S. Pat. No. 7,148,813, the entire disclosure of which is incorporated herein by reference.

This application also claims the priority benefit of U.S. Provisional Application No. 60/815,433, filed on Jun. 21, 2006, the entire disclosure of which is incorporated herein by reference.

BACKGROUND OF THE INVENTION

The present invention is generally directed to an illuminated traffic sign and, more specifically, to an illuminated traffic sign that includes vehicle sensing capabilities.

Traffic signs have been utilized in various locations, e.g., at road intersections, road curves, along roads and at railroad crossings, to alert drivers of motor vehicles to various road hazards and applicable traffic regulations. A number of designers have incorporated one or more light sources within traffic signs and have incorporated traffic signs on certain motor vehicles, e.g., school buses. U.S. Pat. No. 5,635,902 discloses a school bus stop sign that is rotatably coupled to a school bus. The bus stop sign includes an array of light emitting diodes (LEDs) disposed on the stop sign to provide illumination. An associated flashing or pulsing circuit is utilized in conjunction with the LEDs, which may be arranged on a sign to define a word, such as "stop," and may be arranged on both sides of the bus stop sign. The pulsing circuit periodically provides current to the LEDs, which causes them to flash, enhancing the visibility of the bus stop sign to drivers of nearby vehicles and/or children entering and exiting the associated school bus.

U.S. Pat. No. 6,222,462 is directed to an apparatus for warning drivers of the presence of a concealed hazard, such as a concealed school bus stopping location. The apparatus includes a sign, adapted for installation along a highway, with associated warning lights and a receiver. The warning lights are periodically illuminated when the sign is in a warning mode, which occurs when the receiver receives a warning signal from a transmitter that may be located within a school bus. The receiver is electronically connected to electronic circuitry that includes a switch, which flashes the warning lights. In a disclosed embodiment, the warning lights include an LED array. In another disclosed embodiment, a solar panel provides power to recharge a rechargeable battery, which powers the receiver, warning lights and associated electronic circuitry.

U.S. Pat. No. 5,935,190 is directed to a traffic monitoring system that includes a Doppler radar transceiver, a video camera and a digital computer for processing a Doppler signal. The system also includes a video cassette recorder (VCR), a high-speed camera and a laptop computer for downloading control settings and a program from a diskette or memory card to the computer. The system automatically measures the speeds of vehicles, photographs vehicles that exceed a specified speed limit and records prevailing traffic conditions onto a video tape installed within the VCR. The Doppler radar transceiver generates a Doppler signal having a pair of channels. The phase of one channel, with respect to the other channel, provides an indication of whether a vehicle is approaching or receding from the Doppler radar transceiver.

As stated above, traffic signs, e.g., stop signs, speed limit signs, yield signs and railroad crossing signs, are widely utilized to alert a driver of a motor vehicle and to instruct a driver of a motor vehicle to take an appropriate action. However, in many cases, a traffic sign may be concealed from view due to an obstruction, such as tall vegetation, walls, buildings, billboards, a hill and/or a curve in a road. Further, drivers that are unfamiliar with a given area may fail to see a traffic sign, even when unobstructed, and, thus, fail to respond appropriately. As one particular example, the inventor's son was nearly killed and the vehicle he was driving was totaled when a young driver in a small pickup truck ran a stop sign at 55 mph and hit the vehicle in the lower section of the driver's door. The intersection was a two-way stop and the inventor's son was on a through road with no stop sign. The intersection offered no view of the orthogonal road approaching the intersection. In this case, the young driver was distracted and failed to observe a plainly visible stop sign. Such observation failures may be relatively frequent on country roads on the outskirts of populated areas, as any driver can become preoccupied or fail to notice a roadside warning sign with tragic results.

What is needed is a traffic sign that alerts a driver of a motor vehicle to the traffic sign such that the driver of the motor vehicle can take an appropriate action.

SUMMARY OF THE INVENTION

According to one embodiment of the present invention, a traffic system is provided for alerting a driver of a motor vehicle to a traffic sign. The traffic system comprises: an image sensor for capturing images; at least one light source attached to the traffic sign; and a control unit coupled to the sensor and the at least one light source, the control unit comprises a graphic processing unit coupled to the image sensor for processing images captured by the image sensor to detect optical flow of objects within the images so as to discriminate between vehicles and other objects, the control unit illuminating the at least one light source responsive to the detection of a vehicle.

According to another embodiment of the present invention, a vehicle speed monitoring system is provided that comprises: at least one image sensor for capturing sequential images of approaching traffic; and a control unit coupled to the at least one image sensor, the control unit comprises a graphic processing unit coupled to the at least one image sensor for processing images captured by the at least one image sensor to detect optical flow of objects within the images so as to discriminate between vehicles and other objects, the control unit detecting a speed of travel of each vehicle from sequential images.

According to another embodiment of the present invention, a border monitoring system is provided for monitoring activity along a geographical border, where the system comprises at least one monitoring device. Each monitoring device comprises: an image sensor aimed along the border for capturing images along and in the vicinity of the border; and a control unit coupled to the image sensor for processing the captured images and detecting moving objects in the captured images and, when a moving object is detected, causing a signal to be transmitted to a monitoring post indicating that motion has been detected.

BRIEF DESCRIPTION OF THE DRAWINGS

In the drawings:

FIG. 6 is top plan view of a border monitoring system constructed in accordance with an embodiment of the present invention.

DETAILED DESCRIPTION OF THE PREFERRED EMBODIMENTS

Figure 1:
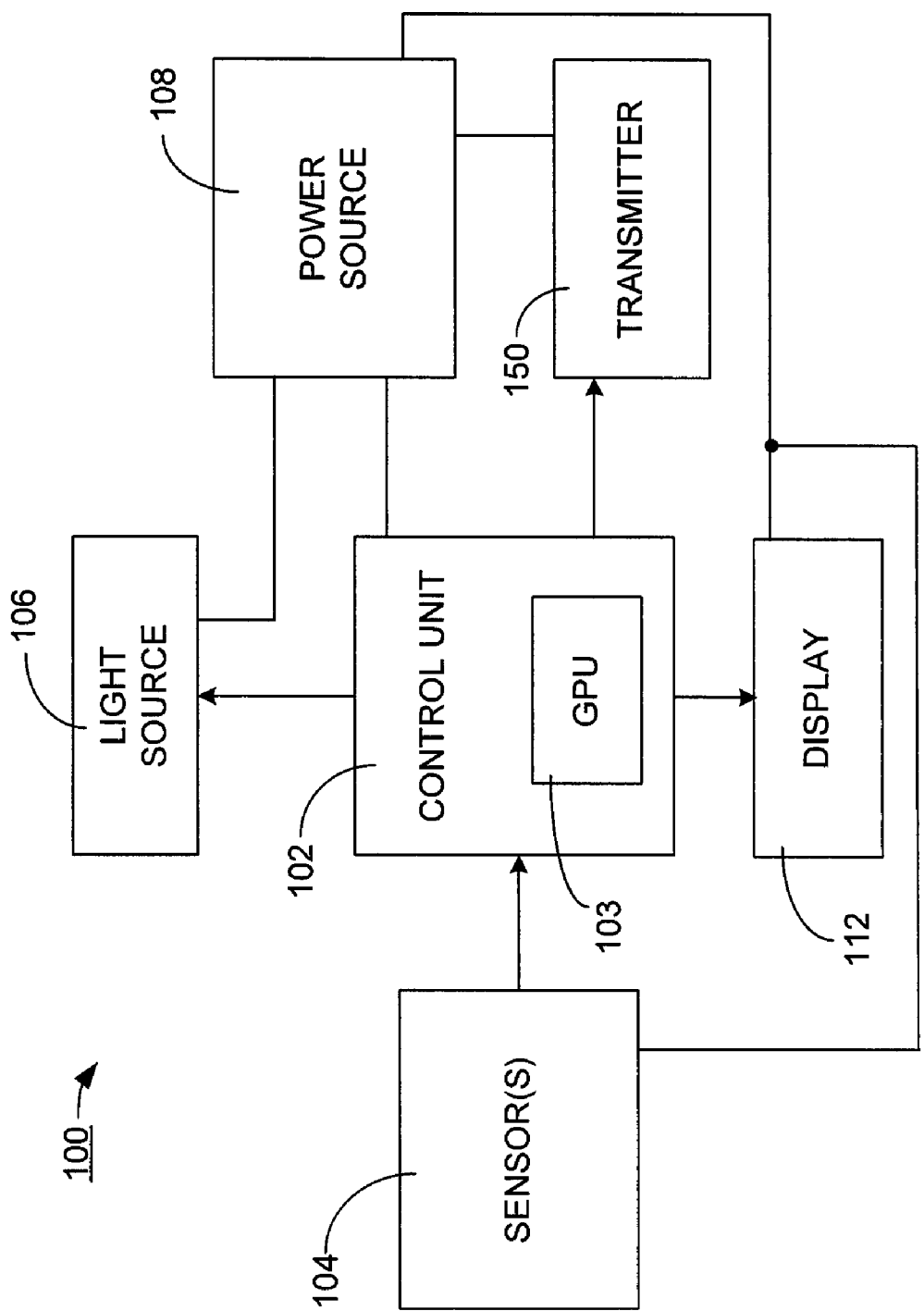
FIG. 1 is an electrical block diagram of a traffic system for alerting a driver of a motor vehicle to an associated traffic sign.

In the implementation of any traffic system, a designer must generally contend with issues of economics and environment. Mass-produced intelligent interactive vehicular signage has the potential to make a two-stop sign intersection nearly as safe as a conventional traffic light, which may cost fifty times as much, with less wasted time of drivers at the intersection, less wasted gasoline and less driver frustration. Seen another way, mass-produced interactive signs with intelligence can cost effectively be used in ten to one hundred times more locations as conventional signs and signals, potentially saving tens of thousands of lives and hundreds of thousands of injuries and vehicular collisions.

According to one embodiment of the present invention, a driver approaching a sign is not alerted if their vehicle is performing in accordance with the sign. If, for instance, a driver's speed is within prescribed limits and a sensor indicates that a vehicle is slowing properly for a stop sign, then there is little reason to flash lights or otherwise distract a driver who obviously sees the stop sign. By the same token, if a vehicle is traveling within specified limits on a highway, there is little reason to use emitted light to draw a driver's attention to a speed limit sign that the driver is obviously obeying. The idea is to avoid alerting a driver when all is okay. This also conserves energy and preserves a driver's peace of mind, avoiding nuisance warnings when there is no need.

On the other hand, if a driver is not slowing appropriately and is unlikely to stop for a stop sign, then a flashing light focused on the driver of the oncoming vehicle may optionally grow even more intense and flash more rapidly as it becomes clear that the driver does not see the sign and has little chance to stop appropriately. By the same token, if a speed limit sign indicates 70 mph and an oncoming vehicle is going 90 mph, then a focused signal may become more aggressive as danger increases.

That is, one aspect of the invention is do not bother drivers if they are performing properly and only attract driver attention when there is a safety need that is likely to result in an unsafe driving situation. The idea of putting the intelligence in the sign and not in the vehicle is another aspect of the invention. Putting intelligence in the vehicle is not a bad idea, but only the newest vehicles will have it. Putting intelligence in the sign itself means every vehicle that passes will benefit. Putting intelligence in every vehicle on the road is a somewhat impractical task, whereas putting intelligence in the signage benefits everyone, regardless of the age or cost of a vehicle. In addition, vehicles get old and eventually are junked, whereas intelligence in the signage generally has a much longer life with far greater economic and environmental efficiency for society.

An optional extension of this concept is to incorporate additional sensors for environmental factors that can affect safety, such as day, night, ice, snow, fog, temperature, rain, traffic density, etc. By using a reconfigurable display on the traffic sign, the driving instructions shown on the traffic sign can be adjusted based on environmental safety factors, with an attendant adjustment by the control circuit of the warning signal light to the approaching vehicle. The traffic sign then becomes increasingly intelligent with each technological advance.

Thus, the present invention is directed to a traffic system and method for alerting a driver of a motor vehicle to a traffic sign. The traffic system detects a motor vehicle and illuminates one or more light source(s) that are attached to the traffic sign responsive to one or more detected motor vehicle(s). According to one embodiment, the system is capable of determining whether the motor vehicle is approaching the traffic sign and only illuminating the light source(s) when the detected motor vehicle is approaching the traffic sign. This conserves power and, in situations where the traffic system is implemented with rechargeable batteries, can advantageously extend the operating life of the traffic system.

An even more energy-conserving control and sensor technique is to sense a vehicle's speed and/or rate of change of speed to make the decision to illuminate the light source(s) on the signage only if the approaching vehicle is not performing within appropriate safety parameters. In this manner, the light signal is only transmitted to the oncoming vehicle when the vehicle is performing outside of prescribed safety criterion required for the purpose of the signage. The aggressiveness of the signal emitted from the sign may be commensurate with the degree to which the vehicle is performing outside the desired safety criterion, and more aggressive signaling can be achieved by raising intensity and/or flash rate. Various types of sensors may be utilized to detect the motor vehicle, such as one or more of the following: a light sensor, an image sensor, a color enhanced image sensor, a passive infrared sensor (PSIR) radar sensor, an image intensified sensor, a stereoscopic image sensor, an IR emitter/receiver sensor, a twin PSIR sensor (using a first PSIR sensor for ambient and a second PSIR sensor aimed at the oncoming vehicle) and multiple light sensors aimed in different directions to balance out effects of ambient light. One optional light sensor is disclosed in U.S. Pat. No. 6,359,274, which is hereby incorporated herein by reference in its entirety.

In one embodiment, the plurality of light sources includes a plurality of light emitting diodes (LEDs) formed in an array. Suitable high-power LEDs are disclosed in U.S. Pat. No. 6,335,548, which is hereby incorporated herein by reference in its entirety. In another embodiment, a power source for powering the sensor, the control unit and the plurality of light sources is provided by a rechargeable battery that receives energy from a solar panel or photovoltaic module.

Turning to FIG. 1, a control unit 102, e.g., including a microcontroller and/or an optional graphic processing unit (GPU) 103, is coupled to a sensor 104, a light source 106, a display 112, when implemented, and an optional transmitter 150. The control unit 102, the sensor 104, the light source 106, transmitter 150, and the display 112, if implemented, receive power from a power source 108, which may include a solar panel that provides a recharging current to a rechargeable battery. The sensor 104 may be of a variety of types, depending upon the implementation, such as a light sensor, which detects light provided by the lighting system of an approaching motor vehicle, or may include a radar sensor, such as a Doppler radar transceiver, which is capable of determining whether a vehicle is approaching or receding from the sensor and/or determining speed and distance.

If a light sensor is utilized, it is preferable that the control unit 102 measures an ambient light level so as to select a threshold level to compare to the light level sensed at any particular instant. Such an ambient light level may be attained as an average level over a specified time interval. By setting a variable threshold as a function of the ambient light level, the control unit 102 may prevent the light sources from being inadvertently illuminated due to bright sunlight. Additionally, the threshold or a second threshold may be used to discriminate between headlights of approaching vehicles and tail lights of receding vehicles. Alternatively, discrimination between such vehicles may be accomplished by limiting the field of view of the sensor to that in which approaching vehicles are expected or using one or more optical filters, such as a red light blocking filter. The light source 106 may also take a variety of forms, e.g., a multi-colored LED array of one or more incandescent bulbs. Alternately, the sign of FIG. 2 may not contain light emitters 106 but may contain only one focused light module 110 aimed at the driver of the oncoming vehicle for most efficient use of energy. One or more additional light sources may be incorporated in the signage as an auxiliary warning where the auxiliary light source(s) are aimed to alert non-offending vehicles of danger. For instance, with a two-way stop intersection, the main goal is to alert drivers approaching the stop sign to come to a full stop, but a secondary goal may be to energize amber warning lights to through traffic that there is imminent danger that a stop sign will be run, thus, allowing non-offending vehicles to slow or stop to avoid a crash.

Figure 2:
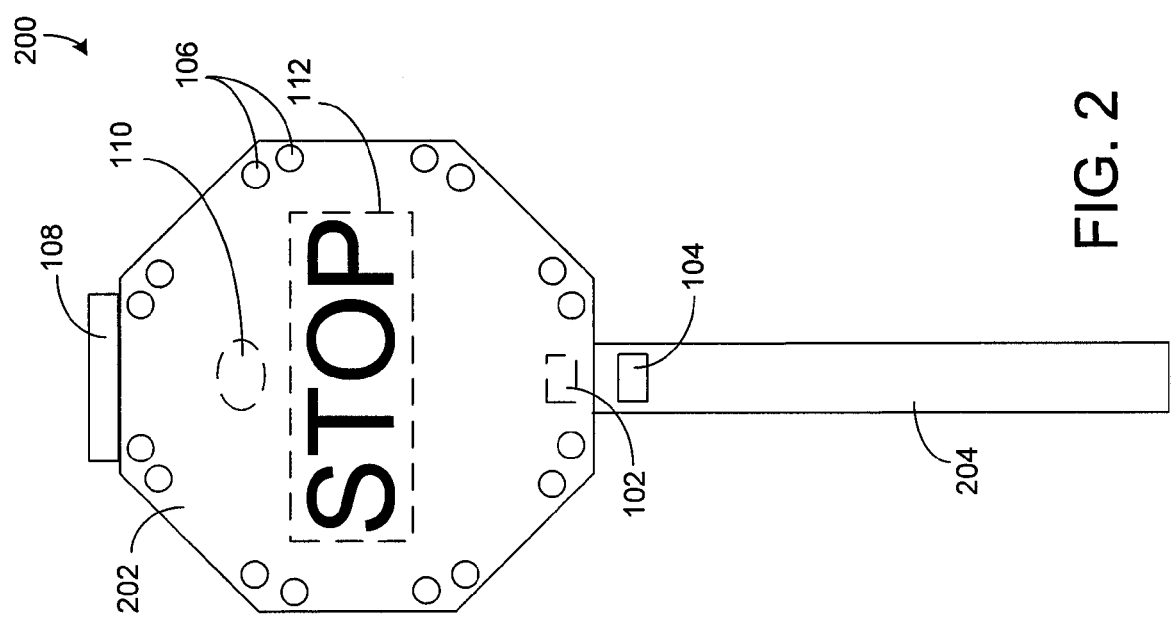
FIG. 2 is a diagram of a traffic control device that includes a traffic sign, particularly a stop sign, a sensor, a light source and a control unit.

FIG. 2 depicts an exemplary traffic sign 202, i.e., a stop sign, which forms a part of a traffic control device 200. It should be appreciated that the present invention may be advantageously implemented within any number of different traffic signs. The traffic sign 202 is coupled to and supported by a post 204 in a conventional manner. Alternatively, the sign may be attached to a number of other support structures. As is shown in FIG. 2, the sign 202 includes a plurality of light sources 106 along an outer periphery of the sign 202. Alternatively, or in addition to, the lights 106 may form a part of the traffic direction, e.g., the word "stop" or the display 112 may be implemented to provide the traffic direction. Further, the sign 202 may not contain light emitters 106 but may contain only one focused light module 110 aimed at the driver of the oncoming vehicle for most efficient use of energy. As is also shown in FIG. 2, a sensor 104 is attached to the post 204. However, it should be appreciated that the sensor 104 may be combined within the traffic sign 202 or located at various other positions.

When the power source 108 includes a solar panel and a rechargeable battery, the power source 108 may be located along a top of the traffic sign 202 or otherwise oriented to receive light from the sun. A control unit 102 is coupled to the sensor 104 and the light source 106 and receives power from the power source 108. Responsive to a motor vehicle detection signal provided by the sensor 104, the control unit 102 may cause the light sources 106 and/or 110 to intermittently turn off and on, i.e., flash at a desired rate. The control unit 102 may also be configured to alter the flash rate and light intensity in response to the degree of danger posed by the oncoming vehicle.

In another embodiment of the present invention, sensor 104 is an image sensor and control unit 102 performs segmentation on the images captured by the image sensor. "Segmentation" is the conventional term in image processing to refer to identifying particular objects within an image and extracting them from the background. Common techniques such as edge detection, region continuity, template correlation, or the generalized Hough transform are typically used to perform segmentation for other applications. Proprietary algorithms such as "Patmax" available in software produced by Cognex Corporation provide improved methods of segmentation which are invariant to the scale or rotation of an object within an image. A detailed discussion of the common methods used for segmentation and the extraction of features in an image is given in the book "Feature Extraction & Image Processing" by Mark Nixon and Alberto Aguado (2002), which is hereby incorporated in its entirety by reference.

A very powerful, but computationally intensive, algorithm that may be used in processing and segmentation of sequential images (e.g., video) received from image sensor 104 is called "Optical Flow." Optical flow determines the motion vector of one or more pixels between two images. A famous algorithm for computing optical flow is the Horn-Schunk algorithm. Details of optical flow computation are described in Robot Vision by Berthold Klaus Paul Horn (1986), the entire disclosure of which is hereby incorporated by reference. Many other algorithms have been developed since then, some of which are more appropriate for different scenarios and some of which trade computational efficiency for performance.

If optical flow is computed between two images, objects in motion may be readily separated from the background with high robustness. Background objects will have no motion and thus no optical flow. Objects of interest, those in motion (such as approaching vehicles), can be extracted by having an optical flow vector of some threshold magnitude. For more robustness, an edge detection algorithm (or other single image segmentation means) can be applied along with optical flow to better segment pixels of objects, which both have motion distinct from the background and which are part of an edge or other significant feature.

The measurement of optical flow can be utilized to effectively implement the smart stop sign application mentioned above. With an image sensor 104 mounted onto the stop sign 202 in the general direction of traffic approaching the sign, images are acquired and the optical flow between two images is computed. If no traffic is present, the optical flow across the image will be zero. If traffic is approaching image sensor 104, some of the pixels will exhibit optical flow and the vehicle can be detected by segmenting the object in the image based upon its optical flow and other edge properties. Once segmented, the width of the object may be computed. The width of the object in the image will vary by the tangent of the distance to the object. By monitoring this width, the percent deceleration of the oncoming vehicle can be determined.

Although it may not be possible to determine the exact distance to the vehicle with a single camera (without knowing the vehicle's actual width), this distance can be approximated by assuming the average width of a vehicle is between 1.5 and 2 meters. The resulting error from such an assumption is believed acceptable for this application. Furthermore, if sufficient resolution is provided in the image sensor, the actual distance can be more accurately determined by computing the height of the lowest portion of the vehicle in the image, i.e., where the rubber hits the road. This point will correspond to the pixels lowest in the image, which exhibit optical flow. Furthermore, these pixels will have downward optical flow since the position of the lower portion of the vehicle will be moving downward in the image as the vehicle approaches.

The distance to the vehicle is computed as the tangent of the angle from horizontal of the lowest point of the vehicle divided by the height off the road of the camera. By monitoring this distance, the velocity and deceleration of the vehicle can be determined and, if the vehicle is not decelerating properly, a warning flash may be initiated from the sign.

The computation of optical flow can be demanding—especially on high-resolution images. Although many modifications of the algorithm have been proposed, many computational operations are performed for any pixel of interest. The computational demands of computing optical flow in real time (for example, at 30 frames per second) would make vision systems quite expensive. However, modern Graphics Processing Units (GPUs) can be used as part of control unit 102 to effectively compute optical flow and other intense image processing algorithms very efficiently and cost effectively. GPUs are typically used in computer graphics adapters to accelerate performance of CAD and video gaming applications where a tremendous amount of three-dimensional graphic computations are preformed in a highly parallel fashion. Image processing algorithms such as optical flow, edge detection, and other filters can also be highly parallelized with the same computations being done on different pixels simultaneously. GPUs are thus highly appropriate for the image processing computations to be performed for the present invention and can provide much higher performance at a much lower cost than conventional processors or DSPs. GPUs are commercially available from NVIDIA Corporation of Santa Clara, Calif. and ATI Technologies Inc., of Markham, Ontario, Canada. Information about programming GPUs can be found on these vendors' Internet web sites or on independent web sites such as gpgpu.org and openvidia.org.

The use of a GPU also allows for more efficient processing of stereo video images. With a stereo vision system, two laterally spaced-apart image cameras (image sensors) are used. The actual distance to an object can be triangulated by comparing the relative location in the images from each camera. Stereo vision techniques are well understood for other applications and are documented in the previously mentioned Horn reference.

In a stereo vision application, objects may first be identified in at least one of the images using segmentation techniques as described above (potentially enhanced using optical flow information). Next, the objects in the image from one camera 104a may be correlated to objects in the image from the second camera 104b. A correlation filter may be used to compare a template block of pixels from the first image to identically sized blocks of pixels in the second image. The block is compared with pixels in the second image at the same coordinates as the first image and also to blocks in the second image offset from the original coordinates. The block in the second image exhibiting the best correlation identifies the location of the object in the second image. The difference in pixel coordinates between the correlated blocks in each image is then used to compute the exact distance to the object in the image. Again, by using optical flow background objects can be removed completely and thus the correlation filter will only need to be implemented on regions of interest. Even so, the correlation of several objects between a stereo pair of images is computationally intense, but as it involves parallel computations on several pixels, it is implemented efficiently on a GPU 103.

Figure 3:
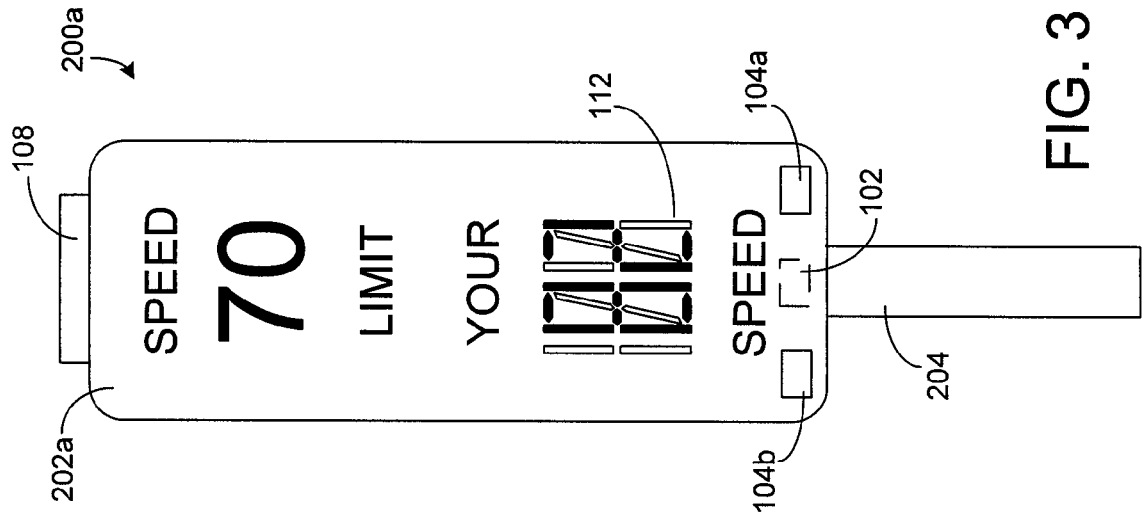
FIG. 3 is a diagram of a traffic control device that includes a traffic sign, particularly a speed limit sign, a sensor, a display and a control unit.

In another application of the present invention, a vision system 100 may be positioned to monitor the speed of traffic for speed limit enforcement. Such a system may be permanently mounted, or temporarily placed, near a road (FIG. 3) or it may be contained in a police patrol car (FIGS. 4, 5A, and 5B) for monitoring other traffic. Using vision systems for speed limit enforcement has two distinct advantages: it is completely undetectable by any means such as a radar detector since no signals are emitted, and a visual recording may be made of the monitored vehicle to provide an additional record to clear up any ambiguity over the traffic infraction. A highly effective traffic speed detection system, such as may be used to replace police radar, can thus be implemented using the above technique. Two image sensors 104a and 104b may be placed spaced apart and fixed at a roadside location such as on a permanent or temporary speed limit sign or a mobile trailer with a speed limit sign/display for unattended operation. FIG. 3 depicts an exemplary traffic sign 202a, i.e., a speed limit sign, which forms a part of a traffic control device 200a. In this case, display 112 may be an electronically reconfigurable segmented display for displaying the speed of an approaching vehicle.

Figure 4:
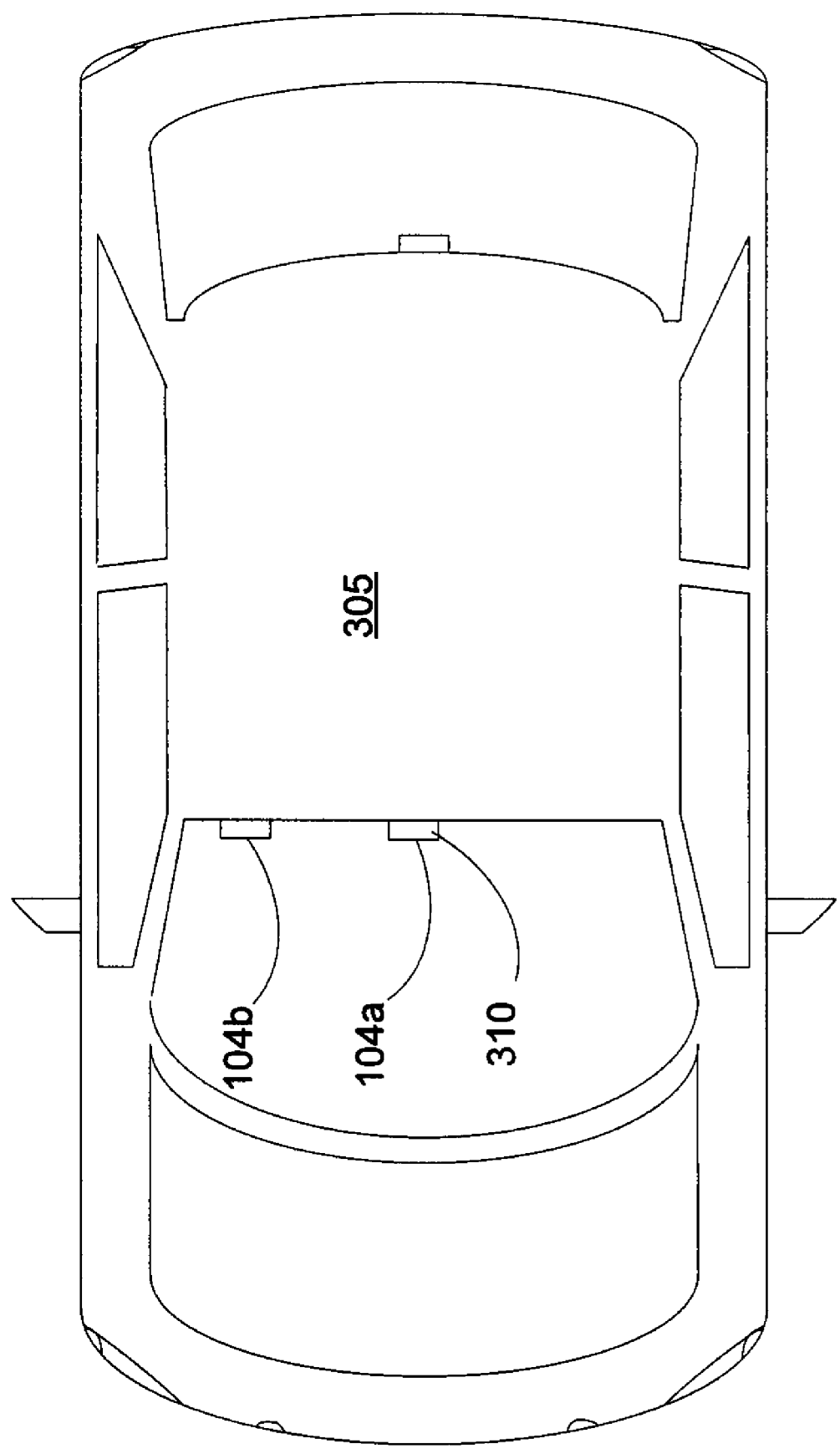
FIG. 4 is a diagram of a vehicle in which is mounted at least some of the components of a speed monitoring system of the present invention.
Figure 5A:
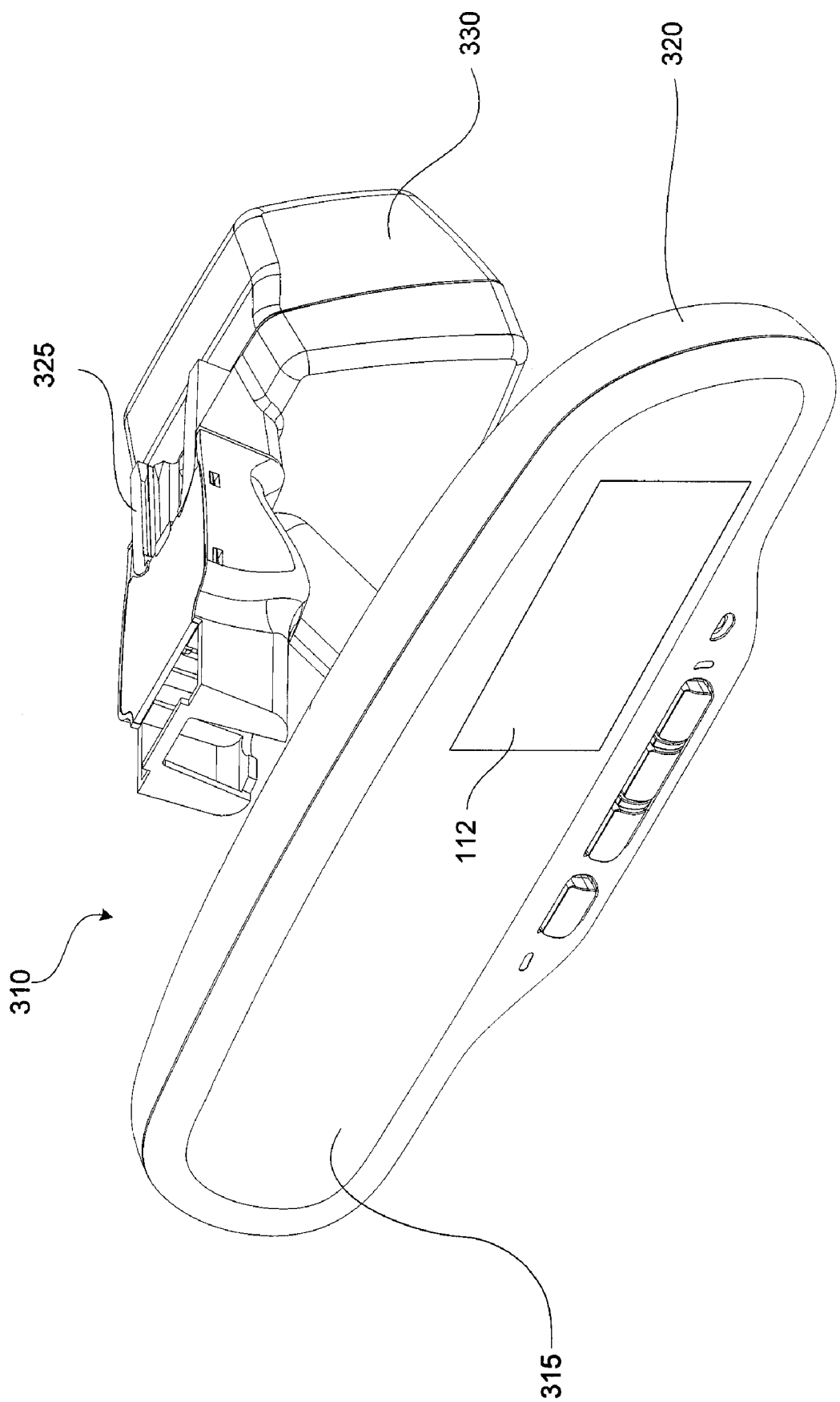
FIG. 5A is a perspective view of a front of a rearview mirror that may be used in the vehicle shown in FIG. 4 as a mounting platform for at least some of the components of the speed monitoring system of the present invention.
Figure 5B:
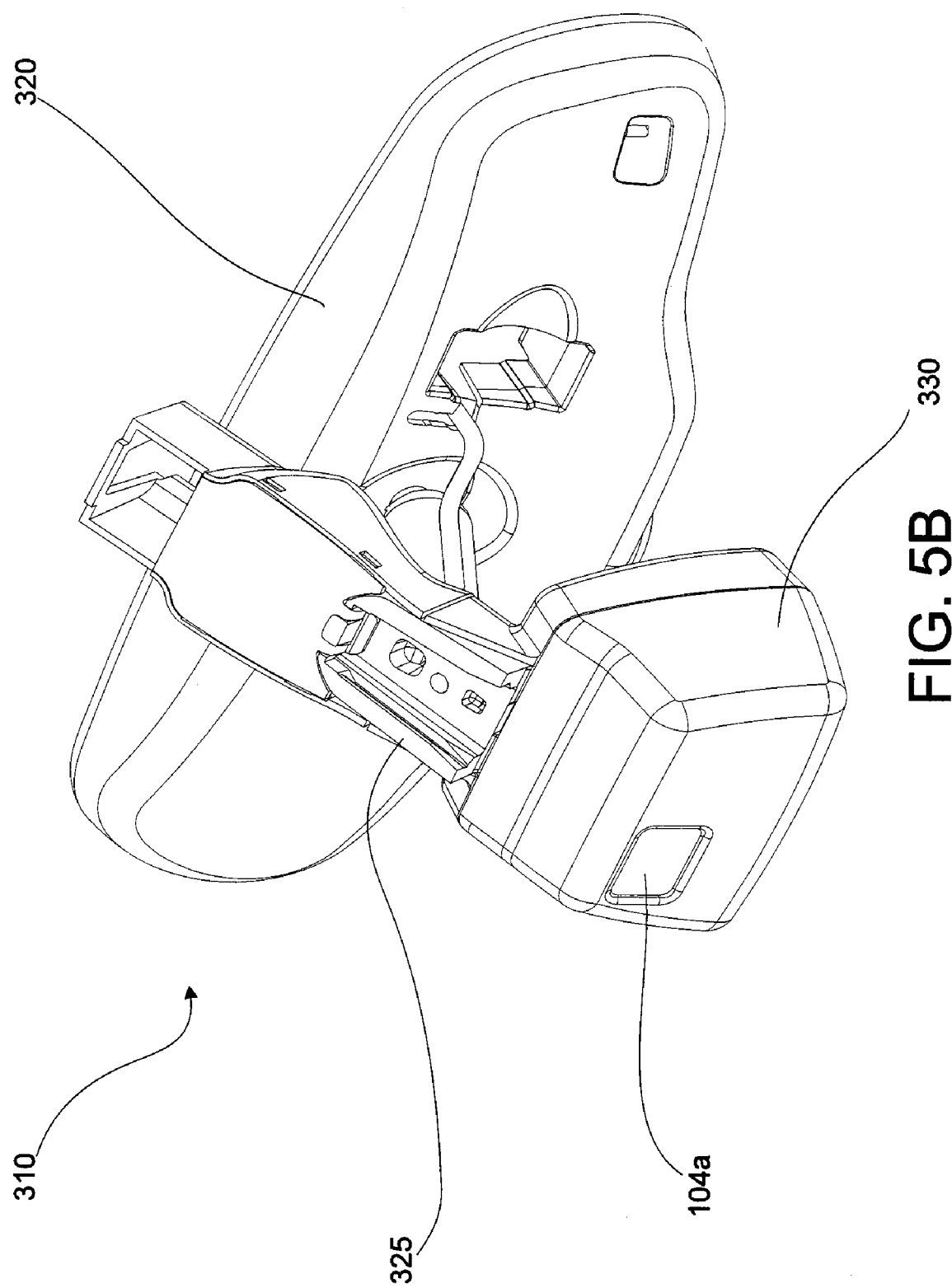
FIG. 5B is a perspective view of a rear of the rearview mirror shown in FIG. 5A.

As shown in FIG. 4, the cameras 104a and 104b may also be mounted in a patrol car 305 looking through the front windshield or other suitable location (FIG. 4). The first image sensor or camera 104a may be mounted in a rearview mirror assembly 310 while the second image sensor or camera 104b may be mounted on or proximate the windshield laterally spaced from mirror assembly 310. As shown in more detail in FIGS. 5A and 5B, rearview mirror assembly 310 may include a mirror mounting bracket 325 for mounting the assembly to the windshield or to the vehicle roof. A mirror housing 320 is pivotably mounted to bracket 325. A mirror 315 is mounted in housing 320 along with a display 112 that may be mounted behind mirror 315 to show therethrough, or may be mounted adjacent mirror 315. Mirror 315 may be transflective such that the display cannot be seen when it is turned off, but can be seen when turned on. Examples of mirror and display combinations are disclosed in U.S. Pat. Nos. 6,356,376 and 6,700,692 and in U.S. Provisional Patent Application No. 60/804,351, the entire disclosures of which are incorporated herein by reference.

The mirror assembly 310 may further include a second housing 330 attached to the mirror mounting bracket 325. Image sensor 104a may be mounted in second housing 330 so as to look forwardly through the vehicle windshield. Details of various constructions of an image sensor mount are disclosed in U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316, 6,774,988, and 6,861,8091; in U.S. patent application Ser. No. 10/777,468; and in U.S. Provisional Patent Application Nos. 60/404,879, 60/394,583, and 60/590,736, the entire disclosures of which are incorporated herein by reference.

The ideal placement of the cameras 104a and 104b will depend on the resolution of the cameras and the desired distance at which a vehicle will be detected. For example, 1920×1080 resolution cameras are used (approximately 2 megapixels) for a 30 degree field of view, and it is desirable to measure the speed of a vehicle at 500 meters away. Furthermore, for accurate detection, there is ideally a 2 pixel displacement between the images of the tracked object in the image. In this case, angle between the two cameras and a 500 meter object should be approximately 0.03 degrees. To achieve this, the cameras should be spaced apart by 25 centimeters (about 10 inches). Of course, different camera resolutions with different spacing may be used to achieve the desired performance specification.

The present invention provides several advantages when used for speed detection. Vision recognition is completely passive and thus is undetectable. It is envisioned that a display could be provided showing one of the two images with an overlay showing the detected speed of each vehicle in the image. This alone is a significant advantage over radar systems capable of measuring only one car at a time. Visual queues, such as a red-yellow-green indicator overlay, may identify speeding vehicles. The display may be a touch screen, allowing the police officer to touch on an object in the image to zoom in or receive more detailed information. Since both the distance to the vehicle and the angle between the vehicle and the sensing system are known, the speed in the actual direction of travel of the vehicle may be determined, thus the patrol vehicle may be oriented at any angle to the monitored traffic. Finally, a visual and data record may be stored on a hard drive or other recording means to allow a review of the infraction should there be any ambiguity. Recording may be continuous or initiated by the officer.

It is envisioned that the speed monitoring system may be placed in a patrol car in the vicinity of the rear view mirror. The cameras may be placed high on the windshield but within the windshield wiper path. A video display may be provided in the same vicinity, potentially replacing the rear view mirror. In this case, a rearward facing camera may be provided to replace the mirror function. The driver may then choose between the rearward camera view and the view from the speed detection cameras. It is also envisioned that the speed function camera may perform other functions, such as recognizing the license plates of other cars. A record may be kept of license plates identified by optical character recognition (OCR) and the speed of the vehicles. In states or countries where it is allowed, traffic tickets may be issued automatically to the registrant of a vehicle. Additionally, license plate numbers of stolen vehicles or vehicles belonging to suspects may be downloaded into the system. If a corresponding license plate number is identified during general driving of the patrol car, the officer may be alerted to the presence of the vehicle.

Another application of the system 100 of the present invention is to use it in a border patrol system. As shown in FIG. 6, a plurality of border monitoring devices 504 may be disposed along a border. Each border monitoring device 504 comprises an image sensor (used interchangeably as "camera") 104, a control unit 102, and a power source 108 (FIG. 1). Optionally, each device 504 may include a wireless (e.g., RF) transmitter 150 and/or a light source 106 as explained further below. The image sensors may be aimed along the border with overlapping fields of view so as to combine to capture images along the border and in the near vicinity of the border so as to detect any objects approaching the border. The image sensors 104 may be constructed to have a very high resolution, with very good lenses and a narrow field of view so as to clearly detect objects over a very long distance to cover a very large swath with each image sensor 104. A corresponding control unit 102 may be coupled to each image sensor 104 to detect moving objects in a similar manner to how vehicles are detected in the above embodiments. More specifically, a GPU 103 may be provided in control unit 102 to monitor the optical flow of any objects in the captured images. If a moving object is detected, an alarm signal may be transmitted to a monitoring post 502 where a border patrol person may view the images from the image sensor that detects the movement.

The monitoring post may be equipped with several display monitors corresponding to the number of image sensors that the monitoring post is responsible for monitoring. Detection of motion in the images from one of the image sensors could trigger an alarm (visual and/or audio) that would prompt the border patrol person to watch the corresponding display monitor. The system may thus provide the advantage of alerting border patrol personnel when someone is trying to break through. Alternatively, a lesser number of display monitors may be provided at the monitoring post such that images are only displayed from an image sensor if there was motion detected within the captured images. In fact, the image signals from the image sensors may not even be transmitted to the monitoring post unless there is motion detected. This provides the advantage of a system that is very convenient and very fast responding so that it can essentially do very little unless there is movement detected. Further, the system can be actively monitoring while operating at a minimum current draw—or even sampling at a minimum current draw—and then when motion is detected, it would wake itself up and send a picture or a constant stream of pictures to the monitoring post. In addition, by only transmitting images when motion is detected, the labor requirement associated with operating the system is significantly reduced—namely, people would not need to watch display monitors all the time, but would only need to watch when there was a need to watch. This not only reduces the number of personnel needed to watch the display monitors, but it also eliminates much of the tediousness of constantly watching display monitors where nothing is happening most of the time.

In the border monitoring system, power source 108 may include a solar panel so that the monitoring devices may be readily positioned and moved without requiring wiring. The monitoring devices could also be covertly hidden to reduce the likelihood of tampering or trying to avoid detection. The monitoring devices could also be permanently positioned by securing them in a housing that is partially positioned in a deep hole with a cement anchor. The monitoring devices may further include a light source 106 that may emit infrared radiation to assist with nighttime detection while not necessarily alerting potential trespassers.

It should be appreciated that the present invention can be incorporated within any number of different types of traffic signs, e.g., a stop sign, a yield sign, a speed limit sign, a railroad crossing sign, a school sign, a curve sign, among other such signs.

Accordingly, a traffic control device has been described herein, which detects a vehicle and alerts a driver of the vehicle to the presence of the traffic sign by periodically illuminating a plurality of light sources. Illumination of the light sources upon detection of a motor vehicle can be particularly advantageous to a driver who is unfamiliar with the area in which they are driving or in bringing to the attention of the driver of the motor vehicle the presence of a traffic sign, which is otherwise obstructed from view.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A traffic system for alerting a driver of a motor vehicle to a traffic sign, the system comprising:
   an image sensor for capturing images;
   at least one light source attached to the traffic sign; and
   a control unit coupled to the image sensor and the at least one light source, the control unit comprises a graphic processing unit coupled to the image sensor for processing images captured by the image sensor to detect optical flow of objects within the images so as to discriminate between vehicles and other objects, the control unit illuminating the at least one light source responsive to the detection of a vehicle, wherein the detected optical flow comprises determining a motion vector of one or more pixels between two images.

2. The system of claim 1, wherein the control unit illuminates the at least one light source when the detected motor vehicle is approaching the traffic sign.

3. The system of claim 1, wherein the at least one light source includes a plurality of light emitting diodes.

4. The system of claim 1 further comprising: a power source for providing electrical power to the sensor, the at least one light source and the control unit, wherein the power source includes a rechargeable battery coupled to a solar panel.

5. The device of claim 1, wherein the at least one light source is energized by the control unit only when a detected approaching vehicle is operating outside prescribed safety parameters that are programmed into the control unit.

6. The system of claim 1, wherein the image sensor is mounted on the traffic sign.

7. The system of claim 1, wherein the control unit activates the at least one light source when a detected vehicle is unlikely to act in conformance with the traffic sign.

8. The system of claim 7, wherein the control unit does not activate the at least one light source when a detected vehicle is likely to act in conformance with the traffic sign.

9. The system of claim 1, wherein the at least one light source is focused at a driver of an oncoming vehicle.

10. The system of claim 9, wherein the traffic sign is a stop sign and the control unit causes the at least one light source to periodically flash when the control unit determines that a detected vehicle is operating in a manner that indicates the detected vehicle is unlikely to stop for the stop sign.

11. The system of claim 10, wherein at least one of a flash rate and light intensity of the at least one light source increases with increasing risk that the detected vehicle will fail to stop in an appropriate manner.

12. The system of claim 1, wherein a power source for electrically powering the system is provided by one of a self-contained solar panel with an associated rechargeable battery and an electrical distribution system exterior to the traffic sign.

13. A vehicle speed monitoring system comprising:
   at least one image sensor for capturing sequential images of approaching traffic; and
   a control unit coupled to the at least one image sensor, the control unit comprises a graphic processing unit coupled to the at least one image sensor for processing images captured by the at least one image sensor to detect optical flow of objects within the images so as to discriminate between vehicles and other objects, the control unit detecting a speed of travel of each vehicle from sequential images, wherein the detected optical flow comprises determining a motion vector of one or more pixels between two images.

14. The vehicle speed monitoring system of claim 13, wherein the at least one image sensor is mounted on a traffic sign.

15. The vehicle speed monitoring system of claim 14, wherein the traffic sign includes warning lights, and wherein the control unit is coupled to the warning lights for activating the warning lights when a detected vehicle is unlikely to act in conformance with the traffic sign.

16. The vehicle speed monitoring system of claim 15, wherein the control unit does not activate the warning lights when a detected vehicle is likely to act in conformance with the traffic sign.

17. The vehicle speed monitoring system of claim 14, wherein the traffic sign includes a display for displaying the detected speed of an approaching vehicle.

18. The vehicle speed monitoring system of claim 13, wherein the at least one image sensor includes a first image sensor and a second image sensor laterally spaced from the first image sensor.

19. The vehicle speed monitoring system of claim 13, wherein the at least one image sensor is mounted in a vehicle.

20. The vehicle speed monitoring system of claim 19 and further comprising a display coupled to the control unit for displaying images captured by the at least one image sensor.

21. A border monitoring system for monitoring activity along a geographical border, the system comprising:
   at least one monitoring device each comprising:
      an image sensor aimed along the geographical border for capturing images along and in the vicinity of the geographical border; and
      a control unit coupled to the image sensor for processing the captured images and detecting moving objects in the captured images and, when a moving object is detected, causing a signal to be transmitted to a monitoring post indicating that motion has been detected, along the geographical border, wherein the control unit comprises a graphic processing unit coupled to the image sensor for processing images captured by the image sensor to detect optical flow of objects within the images so as to discriminate between moving objects and non-moving objects, wherein the detected optical flow comprises determining a motion vector of one or more pixels between two images.

22. The system of claim 21, wherein the signal transmitted by the control unit includes at least one image captured by the image sensor.

23. The system of claim 21, wherein the signal transmitted by the control unit includes a stream of images captured by the image sensor.

24. The system of claim 21, wherein each border monitoring device further comprises an infrared radiation source coupled to the control unit for illuminating a field of view of the image sensor with infrared radiation.

25. The system of claim 21, wherein each border monitoring device further comprises a wireless transmitter for transmitting the signal from the control unit to the monitoring post.

* * * * *

UNITED STATES PATENT AND TRADEMARK OFFICE
CERTIFICATE OF CORRECTION

PATENT NO. : 7,696,903 B2
APPLICATION NO. : 11/609669
DATED : April 13, 2010
INVENTOR(S) : Joseph S. Stam, Frederick T. Bauer and Robert Steel It is certified that error appears in the above-identified patent and that said Letters Patent is hereby corrected as shown below:

Column 7, line 20, "preformed" should be --performed--.

Column 8, line 46, "6,861,8091" should be --6,861,809--.

Signed and Sealed this

Sixteenth Day of November, 2010

David J. Kappos
*Director of the United States Patent and Trademark Office*